June 3, 1930. C. E. MAYNARD 1,760,879
METHOD AND APPARATUS FOR APPLYING TIRE TREADS
Filed Sept. 13, 1926
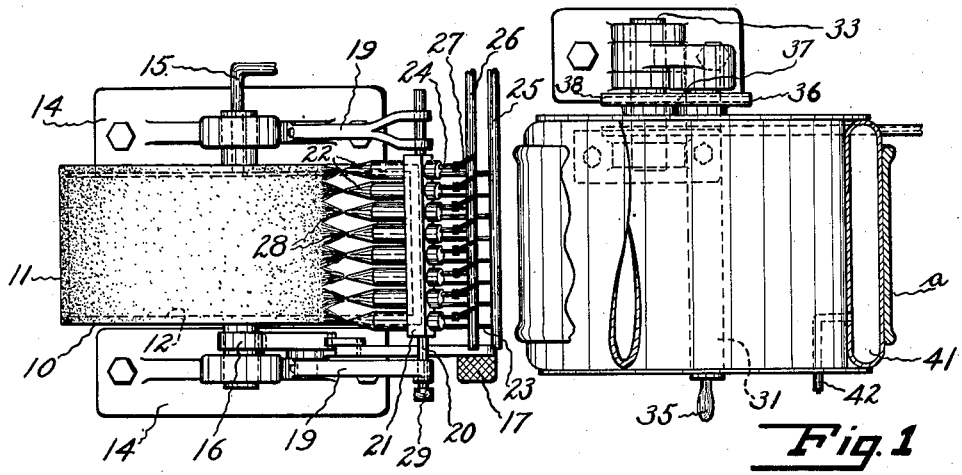
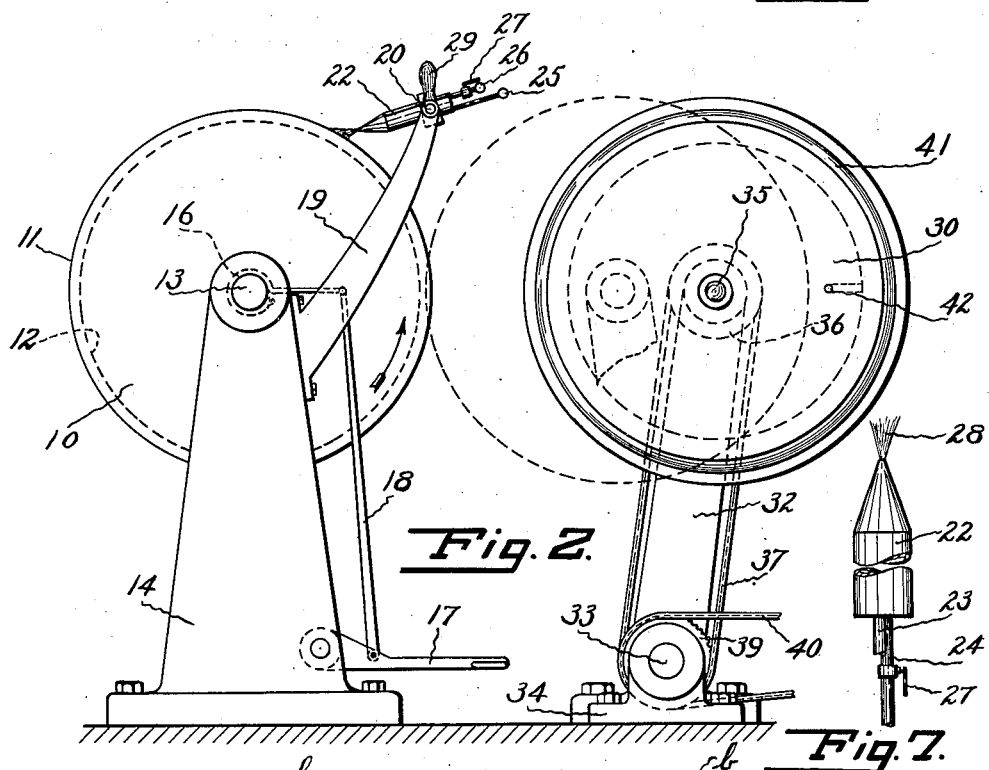
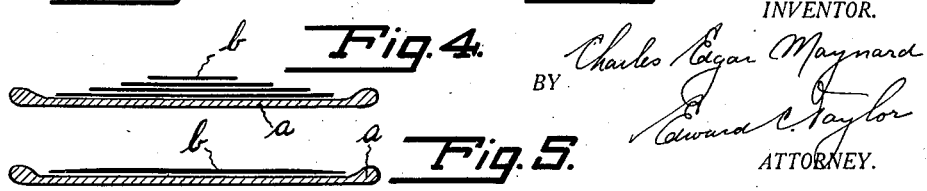
INVENTOR.
Charles Edgar Maynard
BY Edward C. Taylor
ATTORNEY.

Patented June 3, 1930

1,760,879

UNITED STATES PATENT OFFICE

CHARLES EDGAR MAYNARD, OF NORTHAMPTON, MASSACHUSETTS, ASSIGNOR TO THE FISK RUBBER COMPANY, OF CHICOPEE FALLS, MASSACHUSETTS, A CORPORATION OF MASSACHUSETTS

METHOD AND APPARATUS FOR APPLYING TIRE TREADS

Application filed September 13, 1926. Serial No. 134,961.

This invention relates to the formation and application of films of rubber in the manufacture of rubber articles. It has particular reference to the formation and application of rubber treads to tire casings.

One object of the invention is to form a rubber covering such as a tire tread and apply it to the article to be covered such as a tire casing without the necessity of calendering or breaking down the rubber. A further object is to avoid labor in the manufacture of rubber goods of this character. A still further object is to preserve the natural strength of the rubber which has been destroyed in previous methods by the breaking down and calendering processes. A still further object of the invention is the production of a shaped tread without the use of the customary calendering or extruding steps.

Referring to the drawings,

Fig. 1 is a top plan view partly broken away showing an apparatus by which my invention may be practiced in the application of tire treads;

Fig. 2 is a side elevation of the same;

Fig. 3 is a diagrammatic section showing one method of formation of a rubber tread;

Fig. 4 is a similar detail showing a further stage in this operation;

Fig. 5 and Fig. 6 are similar views showing a modified manner of producing a tire tread; and Fig. 7 is a detail of an atomizing nozzle.

In one broad aspect my invention consists in spraying a dispersion of rubber upon a hot surface and in applying the film thus formed to the article to be covered as soon as the film is dry. The invention will be described with particular reference to the formation of a tire tread and the application thereof to a tire casing, but it will be understood that other uses of the invention may be made.

As showing one form of apparatus which may be used in the practice of my invention in the application of tire treads reference may be had to Figs. 1, 2, and 7. These drawings show a drum 10 having a cylindrical or substantially cylindrical surface 11 and preferably being formed hollow as at 12 in order to permit of heating by means of steam. The drum 10 is mounted upon a shaft 13 fixed in pedestal 14. The shaft is preferably hollow and receives steam from a pipe 15 entering the shaft through any suitable stuffing box which it is not necessary to describe. Upon the shaft 13 is mounted a brake 16 operated in the instance shown by a treadle 17 by means of the link 18. Secured to the pedestal 14 are brackets 19 carrying a shaft 20 between their upper ends. Upon this shaft is mounted a holder 21 in which are fitted spray nozzles 22. Connections to these nozzles are made by pipe 23 supplying air under pressure and pipe 24 which supplies a liquid to be sprayed. In the case of the application of a tire tread this liquid is a dispersion of rubber, usually in water, and conveniently in the form of a slightly concentrated latex. The pipes 23 and 24 connect respectively to mains 25 and 26. Valves 27 are placed in the pipe 24 which convey the liquid to the spray nozzles so that the amount of liquid delivered by each nozzle can be controlled individually. In the operation of the device the drum is rotated by mechanisms to be described below. A spray 28 of the rubber dispersion is directed against the surface of the drum by means of the spray nozzles. Since the surface of the drum is heated, the spray soon dries upon the drum forming a thin film of rubber. This rubber is later removed by mechanisms to be described. As a convenience in setting the spray nozzles the shaft 20 may be provided with a handle 29.

A second drum 30 is rotatably mounted upon a shaft 31 carried on a bracket 32 supported upon a pivot 33 in pedestals 34. The end of shaft 31 is provided with a handle 35 by means of which the drum can be moved into either the full or dotted line position of Fig. 2. The drum is rotated during the operation of the device by means of a sprocket 36 connected by a chain 37 with a sprocket 38 mounted upon the shaft 33, a second sprocket 39 on the latter shaft being connected by a chain 40 with any suitable sort of power. Upon the surface of the drum is mounted a pneumatic bag 41 provided with an inflating and a deflating valve 42. This bag serves as a ready means of mounting tire carcass $a$ in place to have a tread applied to it. At the same time the pneumatic bag furnishes a yielding support for the carcass which assists in pressing the tread rubber firmly into position.

A general description of the operation of the type and of the performance of my improved method may now be given. With a tire carcass $a$ mounted upon the drum 30 rotation of the drum is started and the drum with the carcass on it is pressed against the drum 10, causing rotation of the latter. By means of the valves 27 the spray 28 is directed against the surface 11 of the drum 10. The film $b$ thus deposited is dried by the steam heat applied to the interior of the drum during the rotation of the latter, and by the time the film reaches the point of tangency with the drum 30 it is sufficiently dry to be handled as a self-supporting web. The film adheres more tightly to the tire carcass $a$ than to the surface of the drum 10 and for this reason is transferred to the carcass as indicated by Fig. 3 at the point of tangency. Thus only one thickness is at one time upon the drum 11, whereas upon continued operation of the device a plurality of layers of the film may be laid upon the tire carcass.

In the application of a tire tread it is generally desirable to have the center of greater thickness than the edges. I have indicated two methods of accomplishing this result. In Figs. 3 and 4 I have shown a film of constant thickness from edge to edge. As the successive convolutions are applied to the tire tread the valves 27 of the nozzle nearest the edge of the drum are turned off so that the successive layers of rubber will be gradually stepped off as indicated in Fig. 4. In Figs. 5 and 6 I have indicated a second method of securing the desired cross-section of the tread. According to this second method the nozzles are all left on during the complete operation of the machine, but the valves are set so that those nozzles nearer the center of the drum spray a constantly greater amount of liquid than those nearer the edges. This results in the formation of a film of varying thickness as indicated in Fig. 5. As successive layers are added to the tire carcass, the difference in thickness between the edges and the center of the tread becomes more marked, resulting in a tread of the desired cross-sectional dimensions.

While I have described my invention with particular reference to the formation of tire treads, it will be understood that it can be applied to the formation of other articles, or to the covering of articles with a film of rubber. I desire in the appended claims to cover the invention both broadly and in its preferred specific form.

Having thus described my invention, I claim:

1. A method of applying a coating of rubber to an article which comprises depositing a film of rubber dispersion upon a surface, drying the dispersion to form a coherent layer, and transferring said layer to the article progressively with its formation.

2. A method of applying a rubber tread to a tire carcass which comprises spraying a rubber dispersion upon a heated surface, allowing the sprayed film sufficient time to dry, and causing rolling contact between the film and the tire carcass.

3. A method of applying a rubber tread to a tire carcass which comprises spraying upon a heated surface a band of rubber dispersion in greater quantities at its center than near its edges, so as to produce a film of greater thickness at the center than at its edges, and transferring the film thus formed to the carcass in a plurality of convolutions.

4. A method of building a rubber article which comprises spraying a rubber dispersion upon a heated surface, allowing the film time to dry, and rolling therefrom the dried film in a plurality of convolutions progressively and continuously with its formation.

5. An apparatus for building a rubber article, which comprises a heated drum, an atomizing device for spraying a film of rubber dispersion against the surface of the drum, and means separate from the drum for winding up the dried film thus formed.

6. An apparatus for coating an article with rubber which comprises a heated drum, an atomizing device for spraying a film of rubber dispersion against the surface of the drum, and means for pressing the article to be coated against the drum to pick up the film therefrom.

7. An apparatus for applying rubber treads to tire casings which comprises a heated drum, an atomizing device for spraying a film of rubber dispersion against the surface of the drum, and means for holding a tire carcass in contact with the dried film upon the drum.

8. An apparatus for applying rubber treads to tire casings which comprises a heated drum, a series of atomizing nozzles for spraying a film of rubber dispersion against the surface of the drum, means for controlling separately the action of the nozzles, and means for holding a tire carcass in contact with the dried film upon the drum.

9. An apparatus for applying rubber treads to tire casings which comprises a heated drum, a series of atomizing nozzles for spraying a film of rubber dispersion against the surface of the drum, the several nozzles being arranged to discharge a greater amount of the dispersion near the center than near the edges of the drum, whereby a film of a double taper in cross-section will be formed, and means for holding a tire carcass in contact with the dried film upon the drum.

CHARLES EDGAR MAYNARD.